United States Patent Office 3,352,973
Patented Nov. 14, 1967

3,352,973
SYSTEM FOR TRANSMISSION OF INFORMATION RECORDED ALONG ENDLESS MAGNETIC TRACKS
Camillo Bodenstein, Munich, Germany, assignor to Siemens & Halske Aktiengesellschaft, Berlin and Munich, Germany, a corporation of Germany
Filed Jan. 15, 1963, Ser. No. 251,533
Claims priority, application Germany, Jan. 29, 1962, S 77,759
7 Claims. (Cl. 179—6)

The invention disclosed herein is concerned with a method of and a circuit arrangement for prompting, under the control of individual subscribers or stations, the transmission of individual texts of information standing in storers having endless magnetic tracks, for the reading of the respective texts at the corresponding subscriber stations. The terms "subscribers" or "stations," jointly or individually, are to be understood in the broadest sense as embracing, for example, a teleprinter machine or another apparatus adapted to record information, or a group of components of a data or information processing machine.

There are arrangements known, comprising storers of the magnetic drum or plate or other type, which are accessible to a plurality of subscribers, requiring, however, separate means for each subscriber to effect the transmission of desired information for the reading thereof. The switching or circuit expenditure for the prompting of transmission of information increases thereby proportionally to the number of texts and also proportionally to the number of subscribers, that is, proportionally to the product of both.

The object of the invention is to provide a storer of the initially indicated kind which is prompted by subscribers, for transmitting information to be read out, the corresponding subscribers recording the respective selected information with an element sequence which is slower and preferably much slower than the element frequency of the storer. Other subscribers shall be enabled to prompt the transmission of their desired texts from the storer and to read the respective text, during such prolonged interval involving the subscriber engaged in the previously prompted readout.

According to the invention, the expenditure for the prompting of the storer, by a plurality of subscribers, is considerably reduced by allocating to each subscriber a definite section upon one or more transmission tracks of the magnetic storer, entering (writing in) the texts, which are to be selected in known manner, in the sections of the transmission tracks which are allocated to or assigned to the respective subscribers, and conducting these texts from such sections to the respective subscribers.

The expenditure for the switching or circuit means for the prompting increases in such arrangement substantially proportionally to the sum of the number of subscribers and texts, which are as to costs in different categories, since the prompting means is temporarily only briefly seized by the subscribers, so that the same prompting means is, during the relatively long reading time of each subscriber, available for other subscribers. This mode of operation eliminates the necessity of providing for each subscriber separate circuit means for the prompting operation.

A circuit arrangement according to the invention comprises devices for initiating selection (time controlled text selector, magnetic head selector), a time controlled place counter, a rapidly operating storer (core storer), a selection circuit and a distribution register, the rapidly operating storer being in such embodiment of the invention provided as an intermediate storer in which the selected texts are received with a given frequency and from which they are by the action of the place counter released with the same or with another frequency and transmitted to the transmission track by a magnetic head; the time controlled selection circuit being in this embodiment operative to control the release of the texts entered in the transmission track, and the distribution register being operative to distribute the texts to lines corresponding to subscriber places and including gates and monostable flip-flop stages or shift registers according to the number of subcribers. Only one single core storer is required in this circuit arrangement, which comprises a transmission track; without such track, there would have to be provided a core storer for each subscriber.

In another circuit arrangement according to the invention, which comprises devices for initiating selection (time controlled text counter, magnetic head selector, text group selector), a selection circuit and a distribution register, there are provided magnetic transmission heads corresponding in number to the number of subscribers but not fixedly assigned to the respective subscribers, a suitable transmission head being connectible in writing position, by a text group switch, according to the respective subscriber and the text group containing the text involved, there being applicable the following allocation, wherein $u1$ to $un$ are transmission sections, $sI$ to $sN$ text groups, and $U11$ to $U1n$ magnetic transmission heads:

|  | sI | sII | sIII | . . . . | sN–1 | sN |
|---|---|---|---|---|---|---|
| u1 | U11 | U1n | U1n–1 | . . . . | U13 | U12 |
| u2 | U12 | U11 | U1n | . . . . | U14 | U13 |
| u3 | U13 | U12 | U11 | . . . . | U15 | U14 |
| . | . | . | . | . | . | . |
| . | . | . | . | . | . | . |
| . | . | . | . | . . . . . | U1n | . |
| un–1 | U1n–1 | U1n–2 | U1n–3 | . . . . . | U11 | U1n |
| un | U1n | U1n–1 | U1n–2 | . . . . . | U12 | U11 |

Further details of the invention will appear from the appended claims and from the description which is rendered below with reference to the accompanying drawings showing embodiments thereof.

FIG. 1 shows the arrangement of tracks in connection with a storer of the drum type;

FIG. 2 indicates the arrangement of texts upon the information tracks and the arrangement of subscriber sections upon the transmission track;

Figure 1:
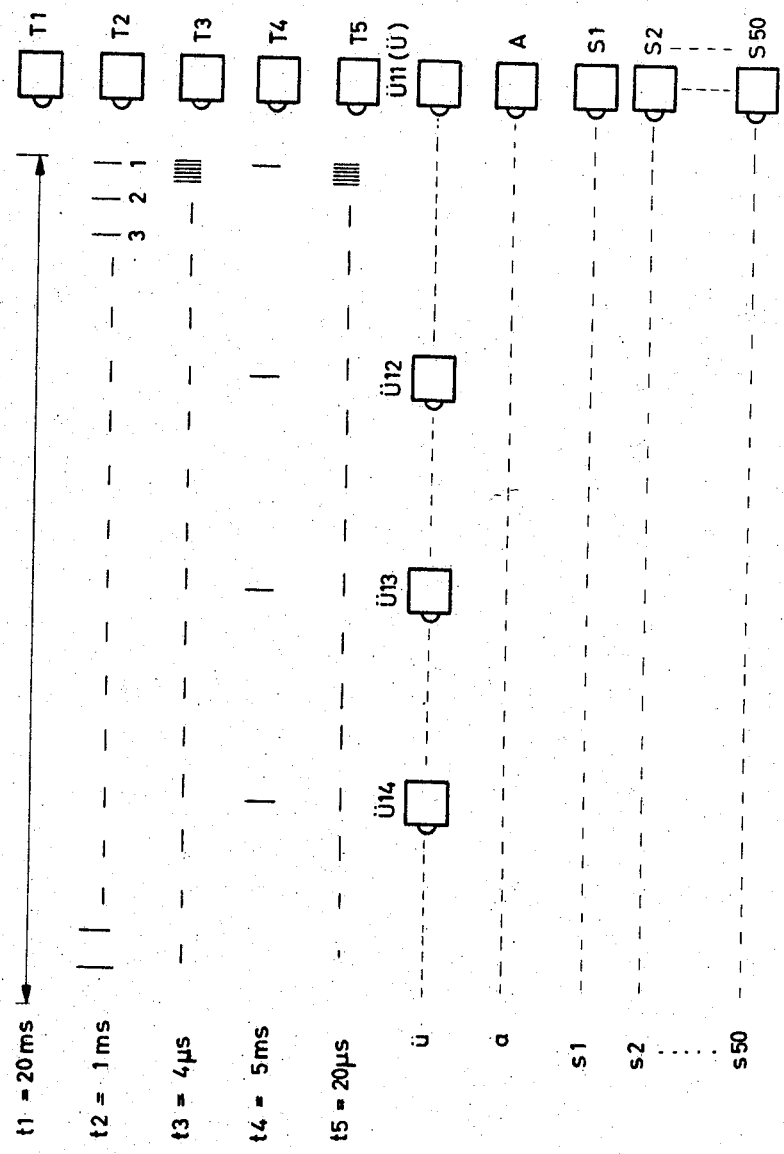

FIG. 1 shows, in developed view of the cylinder of a magnetic drum, the arrangement of tracks disposed thereon. There are disposed on the drum five raster- or timing tracks $t1$ to $t5$ with associated magnetic heads $T1$ to $T5$, a transmission track $u$ with a magnetic transmission head $U$ or four magnetic transmission heads $U11$ to $U14$, respectively, a selection track $a$ with a selection head $A$, and fifty text tracks $s1$ to $s50$ with associated 50 reading heads $S1$ to $S50$. A drum revolution takes 20 milliseconds (20 ms.), corresponding to the cycling frequency $t1$. The timing frequency $t2$ of 1 millisecond (1 ms.) forms a text timing, the timing frequency $t3$ of 4 μs. forms a first element timing, the timing frequency t4 to 5 milliseconds (5 ms.) forms a place timing, and the timing frequency t5 of 20 μs. forms a second element timing. The timing track with the timing frequency t5 is not required for solving the problem according to FIG. 4, and the magnetic transmission heads U11, U12, U13, U14 are not required for the solution of the problem according to FIG. 3, and there is, therefore, provided only a single magnetic transmission head U.

Figure 2:
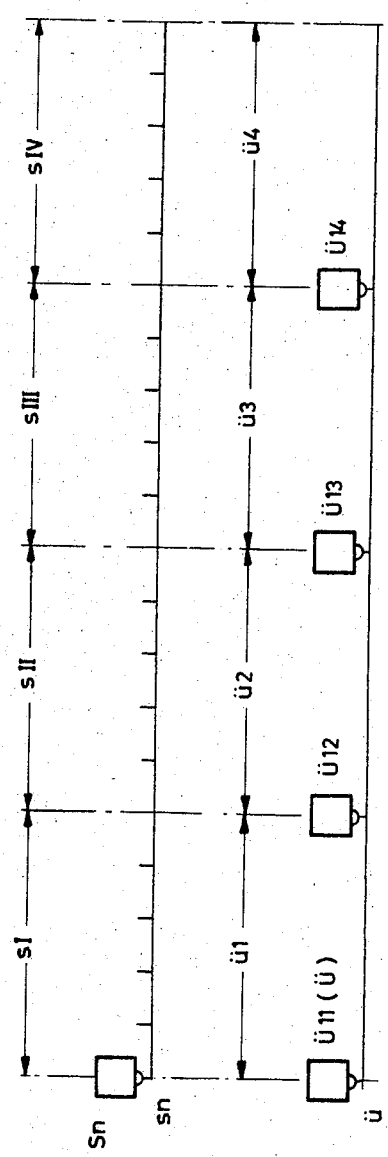

FIG. 2 shows the mutual allocation of the text groups sI to sIV and the subscriber sections u1 to u4 along the transmission track u. The magnetic transmission heads U11 to U14 apply for the solution of the problem according to FIG. 4, and the magnetic transmission head U applies for the solution according to FIG. 3.

Figure 3:
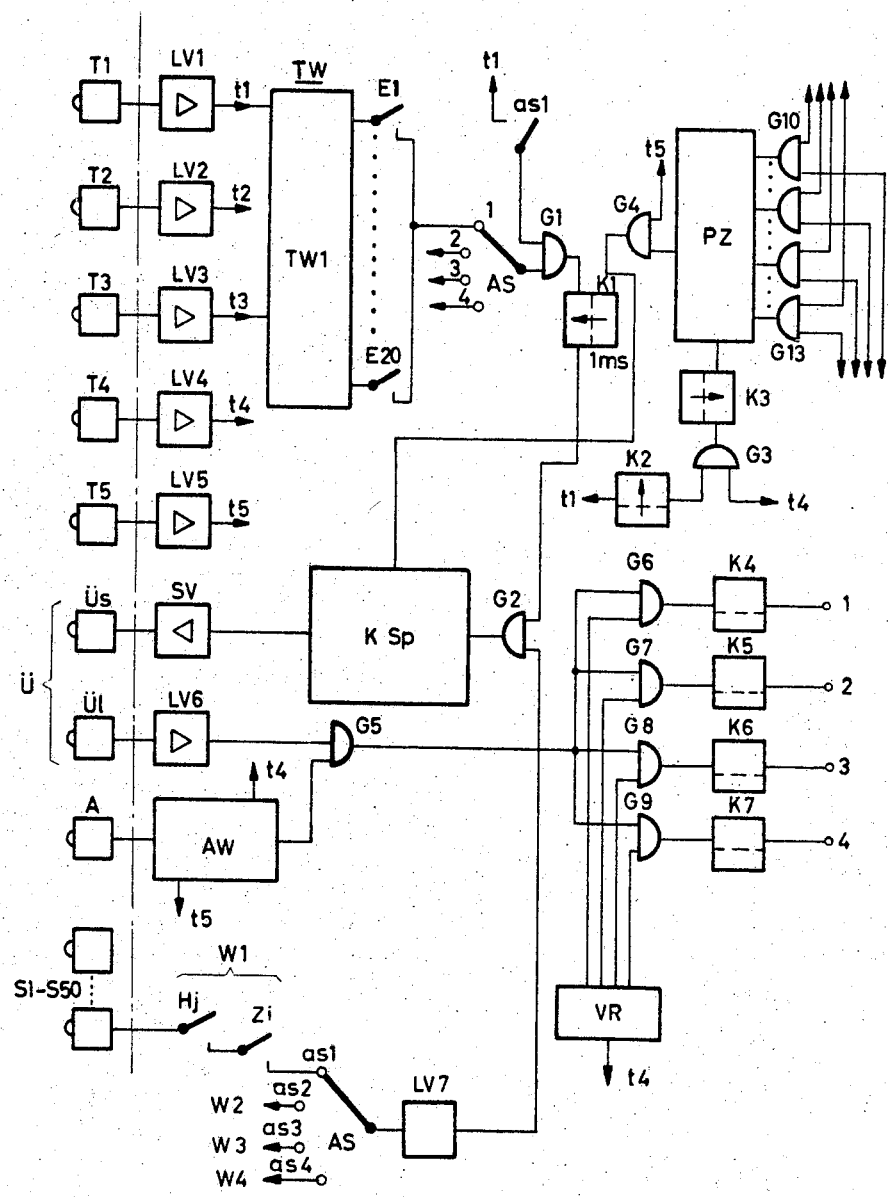
FIG. 3 represents a circuit arrangement with intermediate magnetic core storer.

FIG. 3 shows in block diagram manner a text transmitter comprising an intermediate magnetic core storer KSp. The magnetic heads referred to in connection with FIG. 1 are shown along the left hand side of FIG. 3, the magnetic head U being subdivided into two transmission heads Us and U1 for writing and reading, respectively. References LV1 to LV5 indicate reading amplifiers for the magnetic heads T1 to T5 which deliver the timing frequencies, and LV6 indicates a writing amplifier for the magnetic transmission head Us. In accordance with the selected embodiment, involving 4 subscribers, there are provided: four partial text selectors TW1 to TW4, each having 20 switches E1 to E20 for the "units" position of the text place code (only one partial text selector TW1 being shown), four head selectors W1 to W4 which are at the head side connected in multiple, each such selector having switches Hj, Zi (i=0 to 9; j=0 to 9) for the "hundreds" and "tens" positions of the text place code, four positions as1 to as4 of a call finder AS which is disposed, among others, over four gates G10 to G13, at the input of a place counter PZ, and a distribution register VR for controlling four gates G6 to G9, the output impulses of which can be extended over four monostable flip-flop stages K4 to K7 to the four subscribers 1 to 4. If desired, the number of these parts, there being four units for each part, can be increased or reduced to serve respectively more or fewer subscribers, by correspondingly changing the timing frequencies t4 to t5. The example of the system which is being discussed is assumed to operate with 50 band; appropriate shift registers can be used in place of the flip-flop stages K4 to K7 in the event that other telegraph speeds are desired for the subscribers. The release is then effected by the selection circuit AW, for example, in accordance with symbols instead of according to elements.

Figure 6:
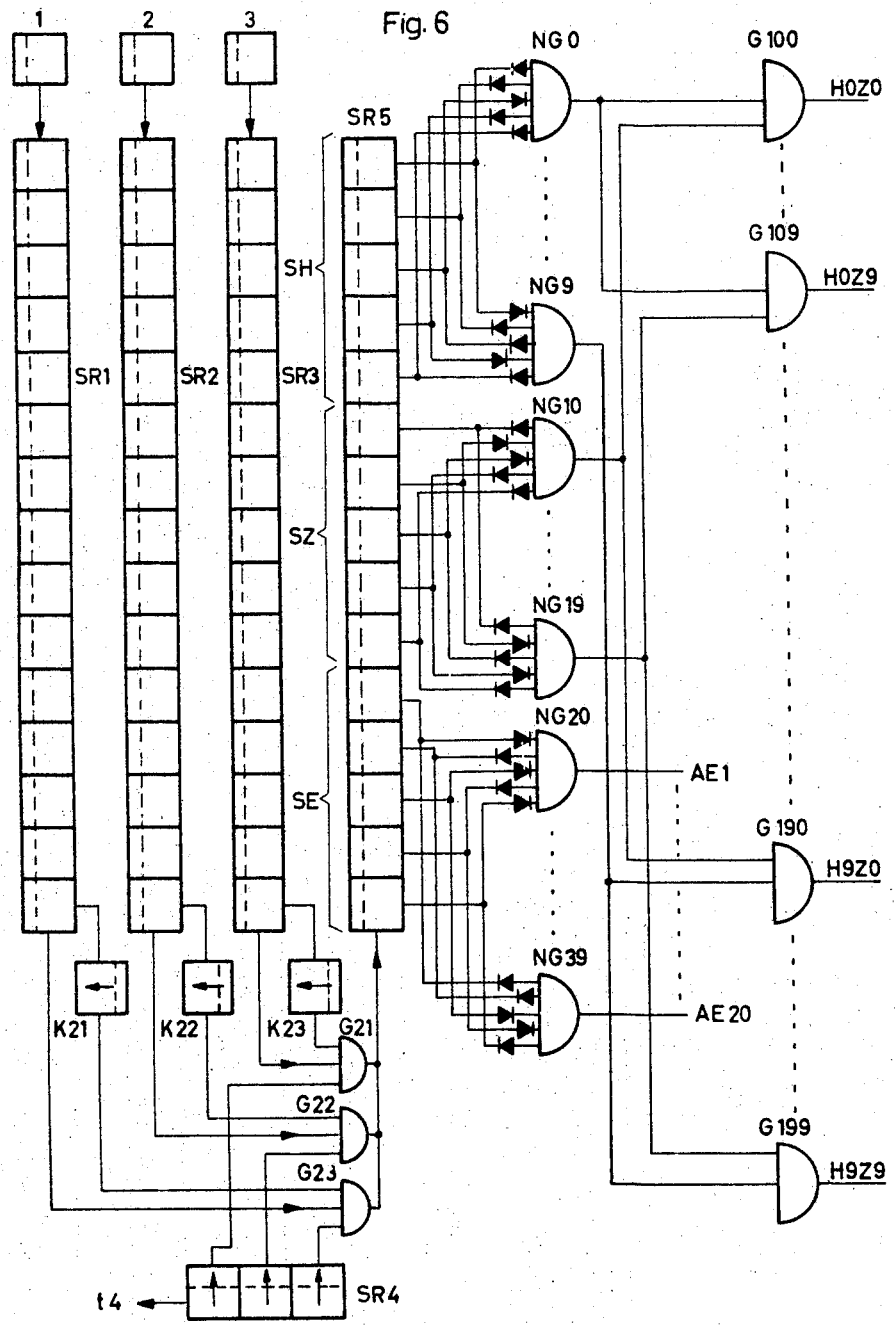
FIG. 6 represents an electronically operating magnetic head selector, call finder and text selector.

The text selection is effected over head selectors—known relay circuits with switches Zi and Hj for the "tens" and "hundreds" positions of the text place code—or by means of a head selector according to FIG. 6; the selected text being extended by way of the call finder AS and the reading amplifier LV7 to the input of a gate G2. The gate G2 is also controlled from the text selector TW1 to TW4 (TW1 being shown in connected position) over a gate G1 and a monostable flip-flop stage K1, and such gate G2 is therefore open only for the duration of the selected text. The content of the core storer KSp is during the next revolution of the magnetic drum or foil storer (endless magnetic tracks are important) recorded in a section u1 to u4 of the transmission track u.

There is here realized the case that considerably more texts are provided in each of the text tracks s1 to s50, namely, 20 texts in the case of 4 subscribers. Accordingly, the selected texts can be provided on the transmission track u with a writing density less than the one with which they are recorded in the respective text tracks s1 to s50. This results in the advantage that simpler components can be used in given cases in the following component stages and gates. This lesser writing density can be obtained with the correspondingly lower timing frequency t5 standing at the input of the gate G4, such gate controlling the release operation of the storer KSp. There are at the input of the gate G4, in addition to the timing frequency t5, also the control pulses of the place counter PZ which effects the allocation of the subscribers 1 to 4 to the respectively applying section u1 to u4 of the transmission track u. The place counter compares the timing pulses t4, counted from the initial impulse t1, with the place number set by the subscriber.

The transmission of a text from the transmission track u to the line of the respective subscriber is effected by the selection circuit AW, such selection circuit operating, for example, as described in the German Patent 1,760,696. This selection circuit is connected with an input of the gate G5 and can open such gate so that the reading current from the magnetic reading head U1 can reach the gates G6 to G9.

Figure 4:
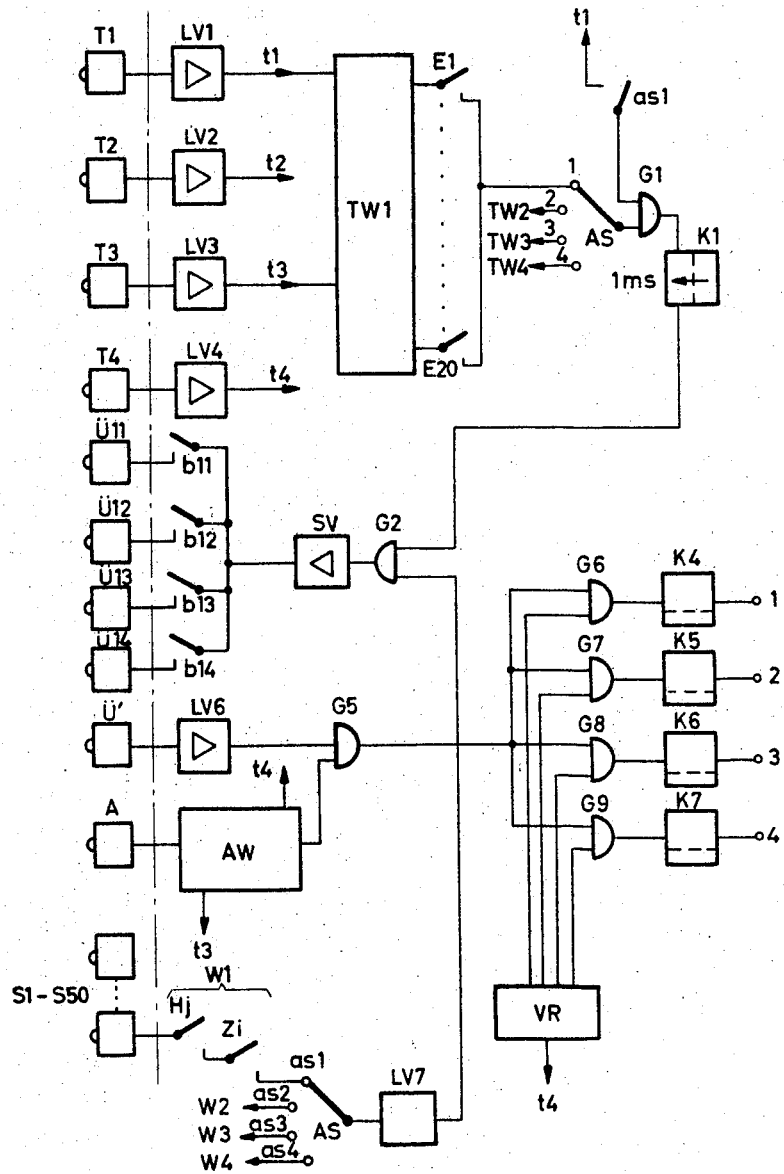
FIG. 4 illustrates a circuit arrangement with four magnetic transmission heads.

FIG. 4 shows an arrangement operating without the core storer KSp (FIG. 3) but having four magnetic transmission heads U11 to U14 disposed along the magnetic drum peripherally thereof. The circuitry of FIG. 4 is similar to FIG. 3 except that the timing track t5 and the device cooperatively associated therewith (magnetic head T5, reading amplifier LV5) are eliminated. The selection of a text as well as the release- and reading operations are effected similarly as in FIG. 3, and the circuit is accordingly similar except for the core storer KSp, the place counter PZ, the flip-flop stages K2 and K3 and the gates G4, G3, G10 to G13.

Figure 5:
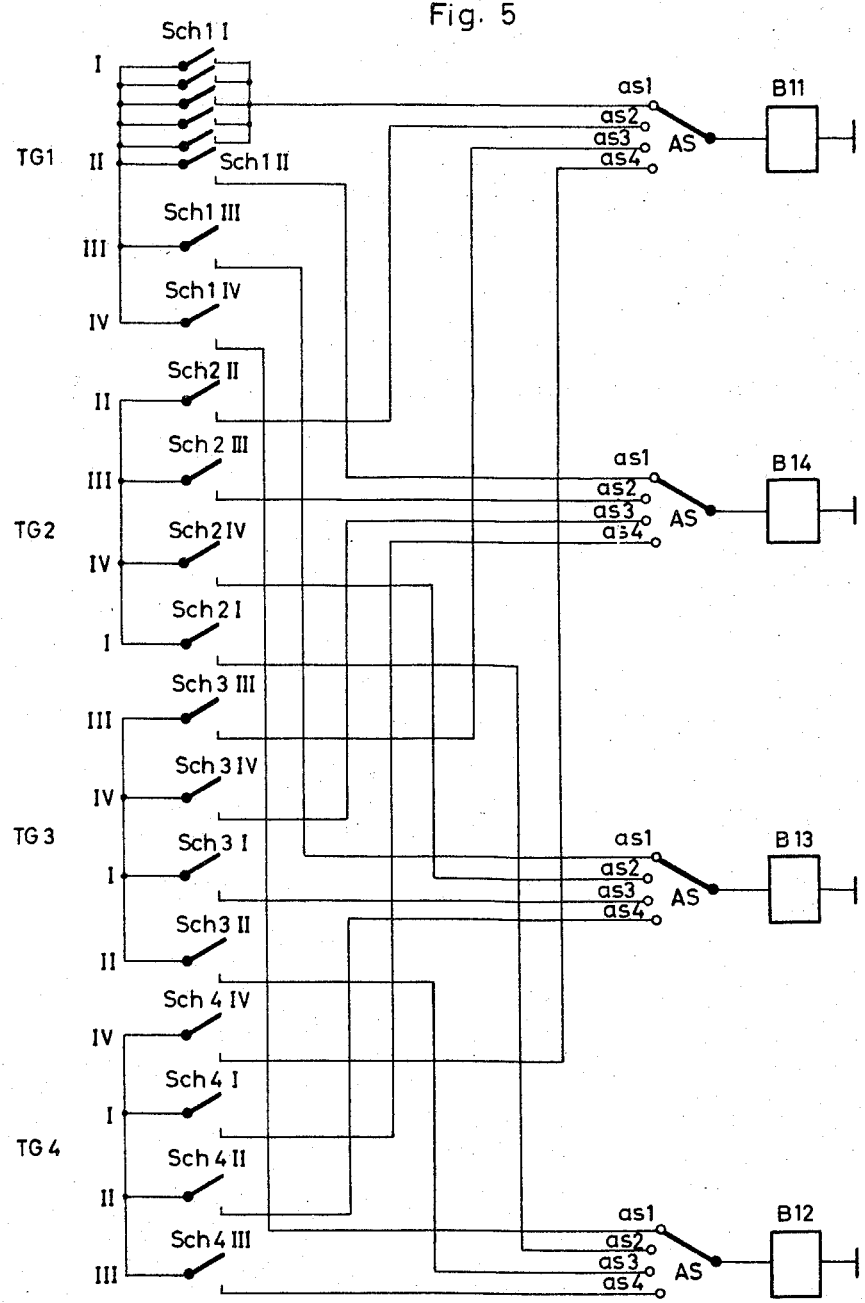
FIG. 5 shows a relay circuit with text group selector, forming a detail for FIG. 4.

The allocation of a selected text to the section u1 to u4 of the transmission track u, which is assigned to a respective subscriber, is effected by a relay circuit, the text group selector TG, shown in FIG. 5. This circuit comprises four text group selectors TG1 to TG4 (which are similar to the partial text selectors) provided with switches Sch1I, Sch1II, Sch1III, Sch1IV . . . Sch4I, Sch4II, Sch4III, Sch4IV, and four relays B11 to B14 having contacts b11 to b14, such contacts being disposed in the circuit described with reference to FIG. 4. Each of the switches Sch comprises five individual switches which are stepped along in the text timing rhythm (t2); it is however also possible to use in place of the individual switches, which are connected together in groups of five switches, a single switch and to step these switches in the timing rhythm t4. The partial text group selectors TG1 to TG4 are by means of the call finder AS cyclically connected with the relays B11 to B14. The partial text group selector TG1 is allocated to the subscriber 1, the selector TG2 to the subscriber 2, etc. The switches Sch1I to Sch4IV, included in the respective partial text group selectors, are by the respective subscribers operatively set for the desired text group sI to sIV, the switches denoted respectively by the suffix I, II, III, IV corresponding respectively to the text groups sI, sII, sIII, sIV. The setting of the call finder AS to the corresponding subscriber place causes energization of the desired relay B11 to B14 and thereby switching to writing position of the desired magnetic transmission head U11 to U14.

The allocation of the text group sI to sIV, transmission section u1 to u4 (subscriber, position of the call finder AS) and the magnetic head U11 to U14 is apparent from a consideration of FIGS. 2 and 5. The result for four subscribers may be noted here in the form of the following table:

| Head U11 to U14 | sI | sII | sIII | sIV | Transmission Section | Subscriber | Call Finder |
|---|---|---|---|---|---|---|---|
| | U11 | U14 | U13 | U12 | u1 | 1 | as1 |
| | U12 | U11 | U14 | U13 | u2 | 2 | as2 |
| | U13 | U12 | U11 | U14 | u3 | 3 | as3 |
| | U14 | U13 | U12 | U11 | u4 | 4 | as4 |

This table may of course be extended to more than four subscribers and more than four text groups. The magnetic transmission heads are designated by U11, U12 ... U1n–1; U1n, the subscribers by 1, 2 ... n–1; the text groups by sI ... sN–1, sN.

| | sI | sII | sIII | ...... | sN–1 | sN |
|---|---|---|---|---|---|---|
| 1 | U11 | U1n | U1n–1 | ...... | U13 | U12 |
| 2 | U12 | U11 | U1n | ...... | U14 | U13 |
| 3 | U13 | U12 | U11 | ...... | U15 | U14 |
| . | . | . | . | . | . | . |
| . | . | . | . | . | U1n | . |
| . | . | . | . | . | . | . |
| n–1 | U1n–1 | U1n–2 | U1n–3 | ...... | U11 | U1n |
| n | U1n | U1n–1 | U1n–2 | ...... | U12 | U11 |

The further transmission of the information recorded on the magnetic transmission track $u$, to the subscriber positions 1 to 4, takes place in the manner described in connection with FIG. 3.

FIG. 6 shows an electronically operating magnetic head selector for three subscribers, comprising an electronically operating call finder and an electronically operating text selector. This magnetic head selector comprises three input shift registers SR1, SR2, SR3, a circuit arrangement corresponding to the call finder AS provided in the circuit according to FIG. 4, comprising a shift register SR4 and three gates G21, G22, G23 as well as monostable flip-flop stages K21, K22, K23, a shift register SR5 with shift stages SH for the "hundreds," SZ for the "tens" and SE for the "units" positions of the text place codes, forty Nor-gates NG0 to NG39 and gates G100 to G199 cooperating with the Nor-gates NG1 to NG19. The Nor-gates NG20 to NG39 for the "units" position of the text place codes are parts of a component corresponding to the text selector TW1 to TW4 of the arrangements shown in FIGS. 3 and 4. The operation of this circuit arrangement is as follows:

From the respective subscribers 1 to 3 are transmitted code impulse groups to the corresponding input shift registers SR1 to SR3. These impulse groups represent text place codes for the writing tracks s1 to s50 and the texts on these tracks. When an input shift register SR1 or SR2 or SR3 is filled, a corresponding monostable flip-flop stage K21 or K22 or K23 will be actuated, thereby preparatorily affecting the respective gate such as G21, G22, G23, so that it can be fully opened by the action of the shift register SR4 which is by the timing rhythm $t4$ stepped from one to the other stage, thereby successively opening the gates G21, G22, G23 insofar as these gates have been prepared by the action of the respective monostable flip-flop stages K21 to K23. The entire content of the corresponding input shift register such as SR1 to SR3 can then pass through the respective gate into the shift register SR5.

This shift register SR5 has five stages SH for the "hundreds" position of the codes, five stages SZ for the "tens" position of the codes, and five stages SE for the "units" position of the codes. The respective stages SH, SZ, SE are connected with inputs of the Nor-gates NG0 to NG9, NG10 to NG19, NG20 to NG39, each Nor-gate having accordingly five inputs. In the corresponding input lines are included rectifiers operating in blocking direction or pass direction, respectively, according to the selected code combination. The storing of code combinations in the parts SH, SZ and SE of the shift register SR5, made one of the Nor-gates NG0–NG9, NG10–NG19, NG20–NG39, in the respective parts conductive. One of the outputs of the Nor-gates NG0–NG9 and one of the outputs of the Nor-gates NG-10–NG19 is respectively conductively connected with the input of one of the gates G100 to G199. The "hundreds" and the "tens" positions of the codes standing in the shift register SR5 give 32 × 32 different combination possibilities. However, in the example of an embodiment according to FIGS. 1 and 4, there are utilized only 50 terminal points for 50 magnetic heads S1 to S50, there being provided in FIG. 5, 100 output lines H1Z$k$ ($l=0 ... 9$, $k=0 ... 9$) for the connection of magnetic reading heads. These output lines H1Z$k$ correspond to input lines extending to the operating elements, for example, relays, for the switches H$j$, Z$i$ of the magnetic head selectors W1 to W4, with the difference that there are four of each of the switches H$j$, Z$i$, and that the selection combinations of these serially disposed switches are already effected. The output lines H1Z$k$ extend directly to the relays which effect the operative connection of the magnetic reading heads or to equivalent known electronic components. The Nor-gates NG20 to NG39 are, as already noted, part of a component corresponding to the text selector TW1 to TW4 of FIGS. 3 and 4, the output lines AE1 to AE20 thereby corresponding to the input lines leading to the operating elements, for example, relays, for the switches E1 to E20 of the text selectors TW1 to TW4, with the difference that the output lines can also serve, as will be presently described, as input lines for a text group selector.

The circuit shown in FIG. 6 can be respectively enlarged or reduced to serve more or fewer than three subscribers, it being for this purpose merely necessary to provide appropriate numbers of shift registers SR1 to SR3, gates G21 to G23, monostable flip-flop stages K21 to K23 and stages of the shift register SR4.

Figure 7:
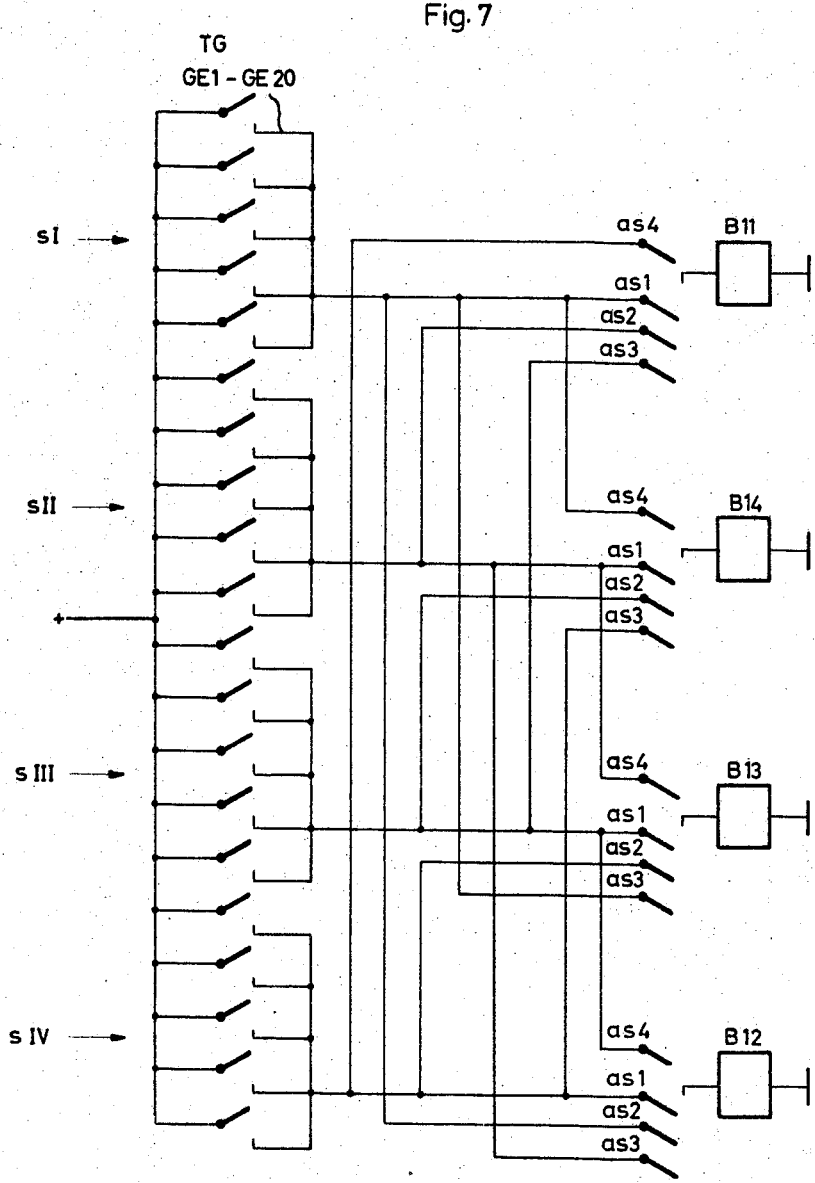
FIG. 7 illustrates a text group selector.

FIG. 7 shows a text group selector TG which is particularly adapted for the construction of the circuit shown in FIG. 6. The lines GE1 to GE20 are in not illustrated manner circuited so that they are traversed by current depending upon impulses appearing in the lines AE1 to AE20 (FIG. 6). These lines GE1 to GE20 are for the text groups $s$I to $s$IV combined in sets of five and extend to the call finder AS which connects them by means of its switch arms $as$1 to $as$4 with the relays B11 to B14. These input lines are disposed so as to obtain the desired allocation (see the first table) of the text groups $s$I to $s$IV, the transmission sections $u$1 to $u$4 and of the magnetic heads U11 to U14. Accordingly, when the subscriber 1 is "in line" for readout, the call finder AS will close the contact $as$1, one of the relays B11 to B14 will energize and connect its associated magnet head U11 to U14 (FIG. 4) in writing position. Analogous operations apply in the case of all other subscribers, the positions of the call finder AS which are respectively assigned to such subscribers, being utilized in the manner noted in the table.

It is within the scope of the invention possible to use in place of the call finder AS an electronically operating component, comprising a circuit including gates and flip-flop stages, and to use in place of the relays R11 to R14 an appropriate known and suitable electronic circuit.

Changes may be made within the scope and spirit of the appended claims which define what is believed to be new and desired to have protected by Letters Patent.

I claim:

1. In a circuit arrangement for the selective control by a plurality of teletype subscribers of information data subdivided into individual texts stored on storage means and transmission of respective selected text sections to corresponding teletype subscribers, the combination of a magnetic storer subdivided into a plurality of storage sections, each subscriber being provided with a permanently assigned section of such storer, other of said sections being arranged to store respective texts for common use by individual subscribers, means operative upon call by a subscriber for a certain text section to duplicate, in a single cycle of the magnetic storer, the text from the selected section, in the corresponding permanently assigned section of the subscriber involved, and transfer means cooperable with the last-mentioned section to transmit the text in such permanently assigned section to such subscriber at the normal transmitting speed there employed for subscriber transmission.

2. A circuit arrangement according to claim 1, wherein the sections of said magnetic storer are in the form of respective endless tracks, and said duplicating means is constructed to transfer the text material from the particular text section to the permanently assigned section involved in a single complete passage of the respective endless tracks involved.

3. A circuit arrangement for use in the art of transmitting, for the reading by subscribers, information stored in the form of individual texts along endless magnetic tracks of a magnetic storer, wherein definite sections upon one or more transmission tracks of the magnetic storer are assigned to respective subscribers, and wherein the texts, which are to be selected, are recorded along the respective sections of the transmission tracks which are assigned to the respective subscribers, for the extension thereof to the corresponding subscribers; said circuit arrangement comprising, a prompting device for extending information for reading, including time controlled text selectors, magnetic head selector, text group selector, a selection circuit, and a distribution register, a plurality of magnetic transmission heads which are not fixedly assigned to but correspond to the number of subscribers, and a text group selector for placing a suitable magnetic transmission head in writing position depending upon the prompting subscriber and the text group in which the prompted text is contained, the allocation thereby applying being in accordance with the following table in which $u1$ to $un$ represent respective transmission sections, $sI$ to $sN$ represent respective text groups, and $U11$ to $U1n$ represent respective magnetic transmission heads:

|      | sI    | sII   | sIII  | . . . . . | sN-1 | sN   |
|------|-------|-------|-------|-----------|------|------|
| u1   | U11   | U1n   | U1n-1 | . . . . . | U13  | U12  |
| u2   | U12   | U11   | U1n   | . . . . . | U14  | U13  |
| u3   | U13   | U12   | U11   | . . . . . | U15  | U14  |
| .    | .     | .     | .     |           | .    | .    |
| .    | .     | .     | .     | . . . . . | .    | .    |
| .    | .     | .     | .     |           | Uin  | .    |
| un-1 | U1n-1 | U1n-2 | U1n-3 | . . . . . | U11  | U1n  |
| un   | U1n   | U1n-1 | U1n-2 | . . . . . | U12  | U11  |

4. A circuit arrangement according to claim 3, for placing magnetic transmission heads in writing position, wherein said text group selector includes a plurality of partial text group selectors comprising, for the individual text groups, switches which follow in cyclic succession in an order beginning respectively with the switches for the text group which lies upon the endless magnetic track in the same angular position, referred to one revolution, as the transmission section of the subscriber served by the corresponding partial text group selector.

5. A circuit arrangement according to claim 3, wherein the transmission of information stored in the form of individual texts along endless magnetic tracks is prompted by respective subscribers, with the aid of code impulse groups, input shift registers allocated to given subscribers, a common shift register having a plurality of groups of stages, means for preparing input shift registers for co-operation with said common shift register, means for transmitting to said common shift register successively in timed relation the electrical conditions of prepared input registers which conditions correspond to said code impulse groups, means for connecting with Nor-gates each group of stages of the common shift register which corresponds respectively to a place value of the supplied text place code, means for extending the output impulses of said Nor-gates, for the connection of magnetic reading heads and switches, to output lines directly or after passing through further gate circuits, the input lines of which constitute combinations of output lines of the Nor-gates which are separated according to the place values.

6. A circuit arrangement according to claim 5, for placing magnetic transmission heads in reading position, comprising means for connecting together in groups the input lines of the text group selector in accordance with the number of the texts, wherein the incoming impulses in these groups are jointly with the call finder or electronic component equivalent thereto operative directly or over an amplifier circuit to actuate the means for placing the magnetic transmission heads in reading position.

7. A circuit arrangement for use in the art of transmitting, for the reading by subscribers, information stored in the form of individual texts along endless magnetic tracks of a magnetic storer, wherein definite sections upon one or more transmission tracks of the magnetic storer are assigned to respective subscribers, and wherein the texts, which are to be selected, are recorded along the respective sections of the transmission tracks which are assigned to the respective subscribers, for the extension thereof to the corresponding subscribers; said circuit arrangement comprising, prompting devices, for transmitting information for reading, including time controlled text selectors and a magnetic head selector, a time controlled place counter, a rapid storer, a time controlled selection circuit and a distribution register, said rapid storer operating as an intermediate storer, means for extending selected texts to said intermediate storer with a given timing frequency, means controlled by said place counter for releasing the corresponding texts from the intermediate storer with a desired timing frequency, for transmission, by means of a magnetic transmission head, to the transmission track, means governed by said selection circuit for controlling the release of the texts recorded along the transmission track, and means controlled by the distribution register for distributing the texts to lines extending to the corresponding subscriber places and including gates and control elements of the type of monostable flip-flop stages or shift registers corresponding in number to the number of subscribers.

References Cited

UNITED STATES PATENTS 2,722,676    11/1955    Begun _____ 340—174.1

TERRELL W. FEARS, *Primary Examiner.*